Figure 4:
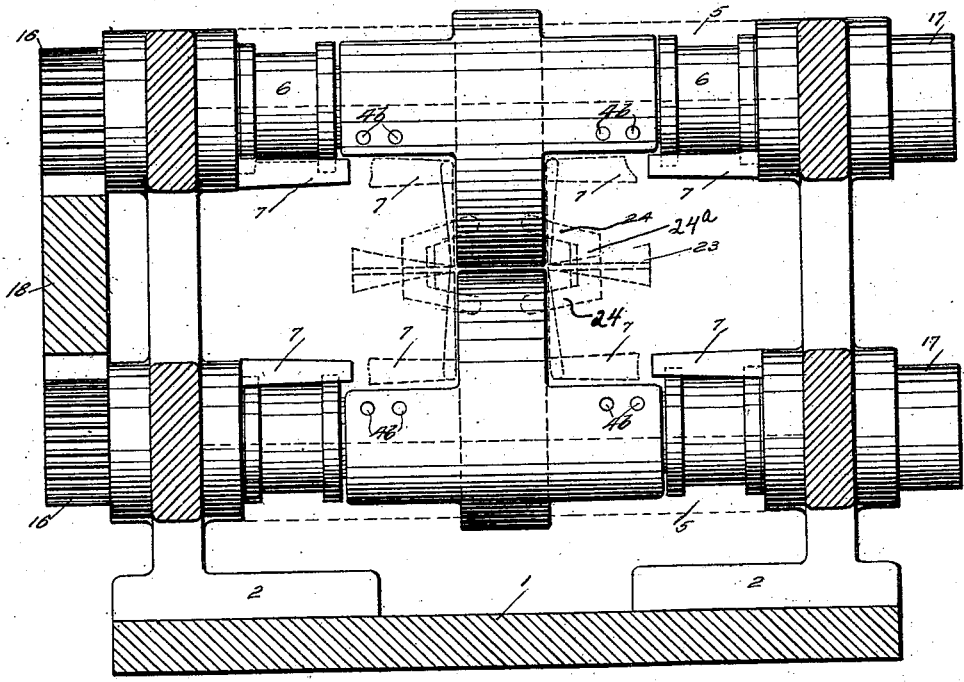

No. 690,491. Patented Jan. 7, 1902.
G. R. WARD.
BAG MACHINE.
(Application filed Dec. 3, 1900.)
(No Model.) 4 Sheets—Sheet 1.
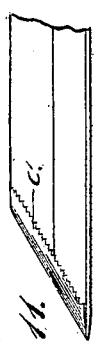
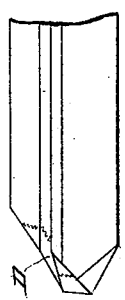
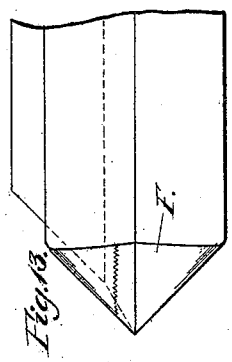
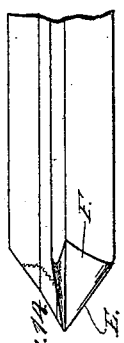
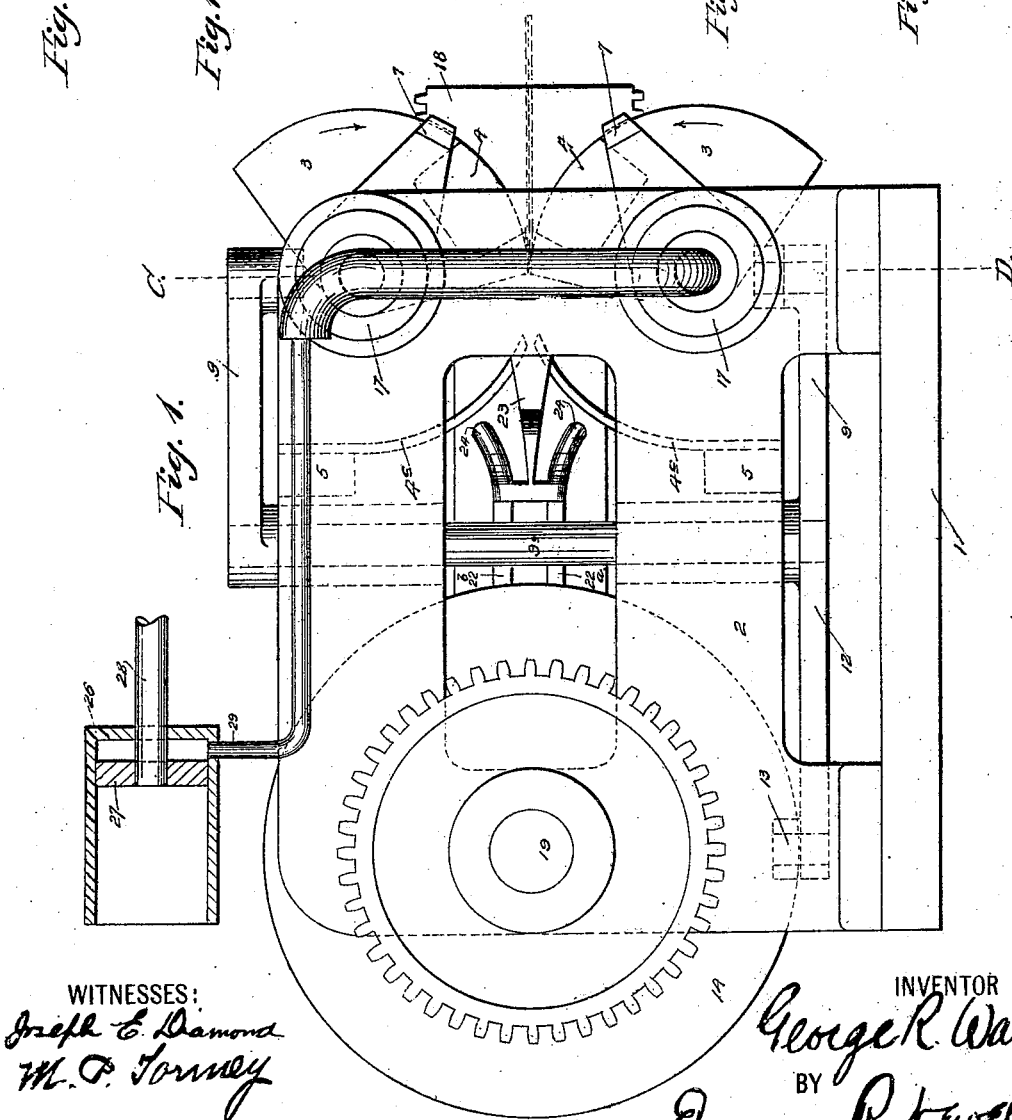
WITNESSES:
INVENTOR
George R. Ward
BY
Emerson R. Newell
ATTORNEY No. 690,491. Patented Jan. 7, 1902.
G. R. WARD.
BAG MACHINE.
(Application filed Dec. 3, 1900.)
(No Model.) 4 Sheets—Sheet 2.
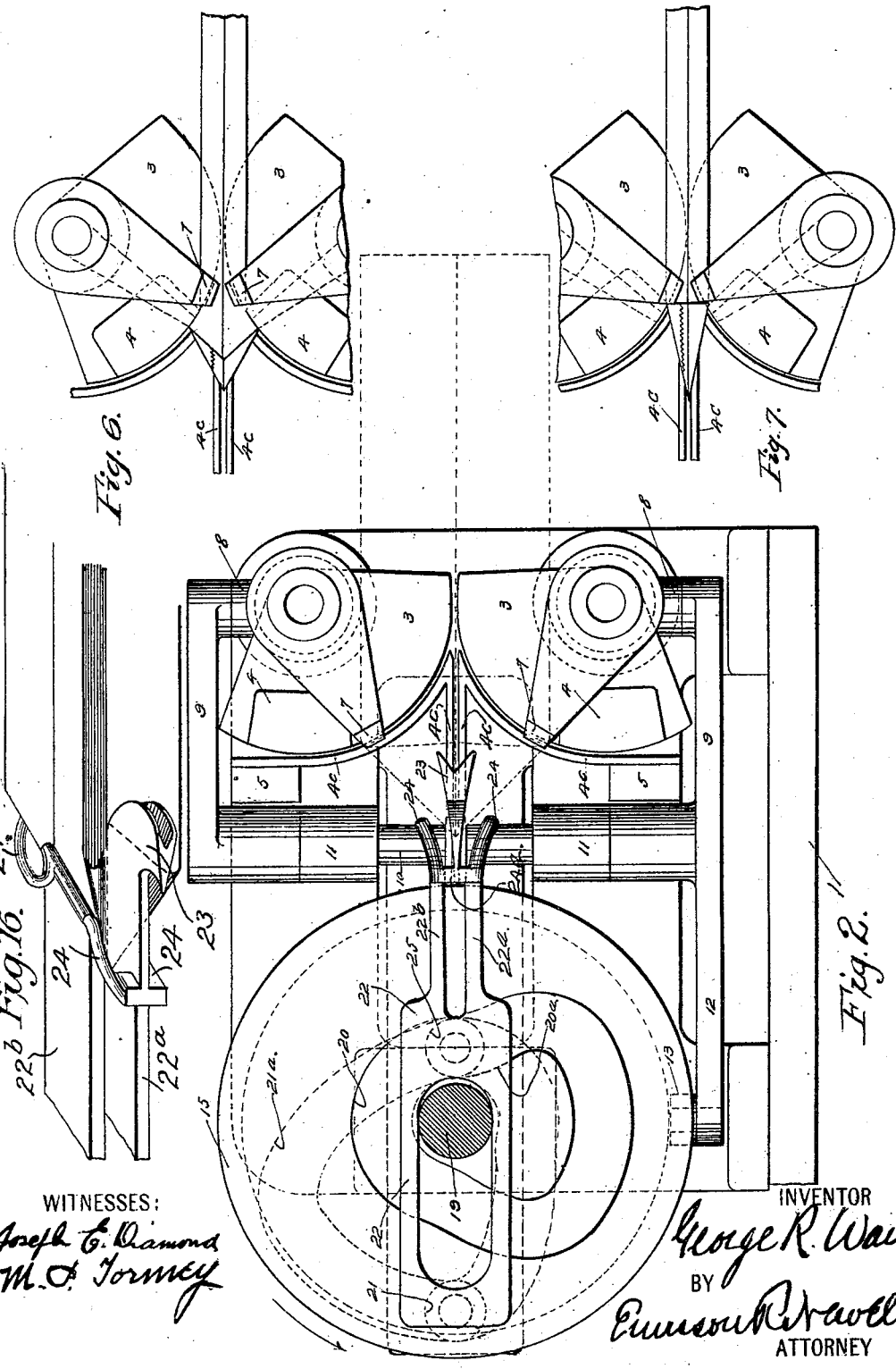
WITNESSES:
INVENTOR
George R. Ward
BY
ATTORNEY No. 690,491. Patented Jan. 7, 1902.
G. R. WARD.
BAG MACHINE.
(Application filed Dec. 3, 1900.)
(No Model.) 4 Sheets—Sheet 3.
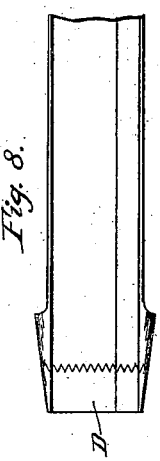
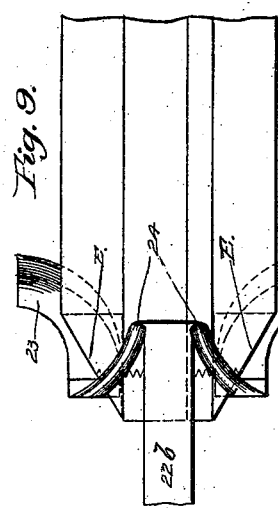
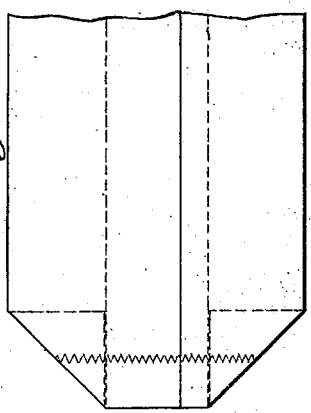
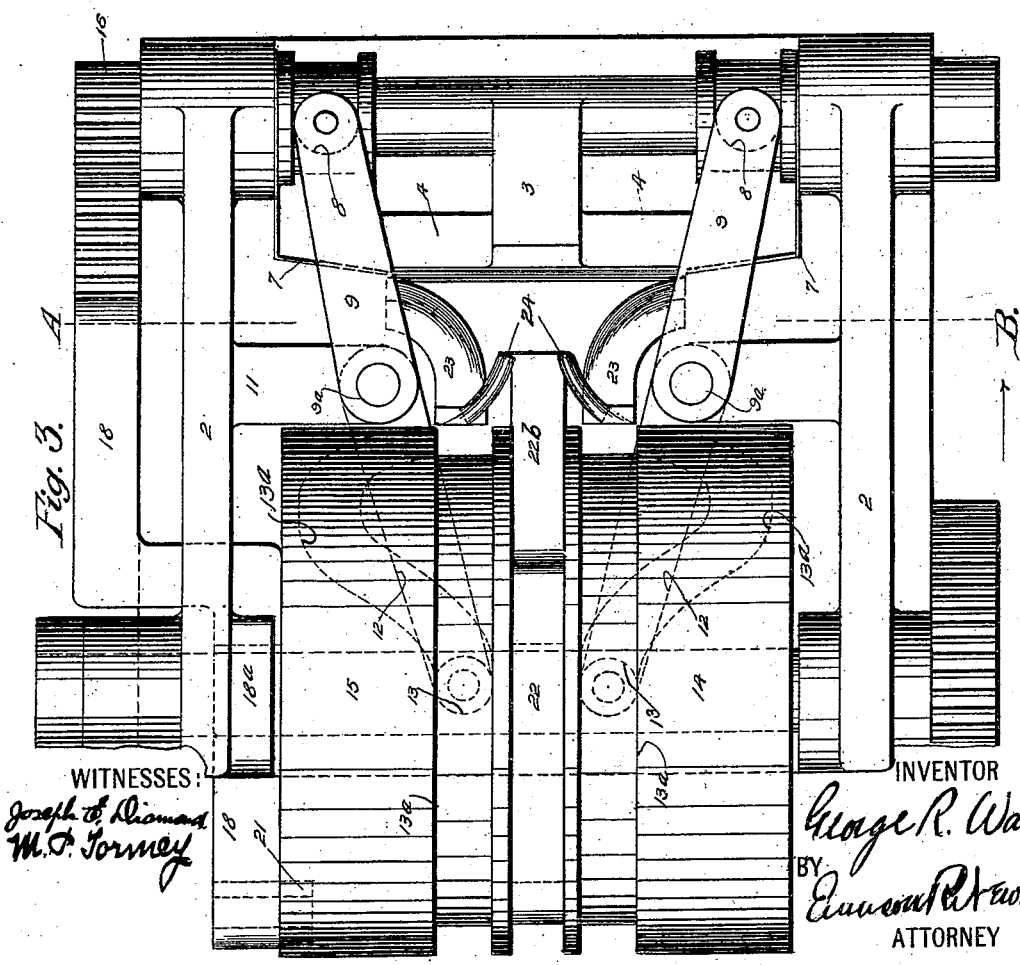
WITNESSES:
INVENTOR
George R. Ward
BY
ATTORNEY No. 690,491.  
G. R. WARD.  
BAG MACHINE.  
(Application filed Dec. 3, 1900.)  
Patented Jan. 7, 1902.

(No Model.)

4 Sheets—Sheet 4.

WITNESSES:

INVENTOR  
George R. Ward  
BY  
ATTORNEY

UNITED STATES PATENT OFFICE.

GEORGE R. WARD, OF NEW YORK, N. Y., ASSIGNOR TO CHARLES F. COBURN, OF BOSTON, MASSACHUSETTS.

BAG-MACHINE.

SPECIFICATION forming part of Letters Patent No. 690,491, dated January 7, 1902

Application filed December 3, 1900. Serial No. 38,413. (No model.)

*To all whom it may concern:*

Be it known that I, GEORGE R. WARD, a citizen of the United States, residing at New York, State of New York, have invented certain new and useful Improvements in Bag-Machines, of which the following is a clear, full, and exact description.

My invention relates to bag-folding machines; and my object is to provide a construction which will receive a bag and fold the same in the manner desired. It is desirable in a completed bag that when the same is filled with material or distended by the air it should automatically assume a rectangular form and its bottom also have an angular, preferably a rectangular, form.

One object of my invention is to provide a machine which will so fold a bag that the bottom of the same will when the bag is distended in use automatically assume the square-bottomed shape.

In the preferred embodiment of my invention shown in the drawings I have provided a machine which will receive a bellows-folded bag in a flattened condition, distend part of the same, and fold the corners at the bottom of the bag backward between the plies, whereby the bottom of the bag will automatically assume a rectangular form when the same is filled.

Other advantages of my invention will be apparent, and my invention will be more particularly defined in the claims.

Figure 5:
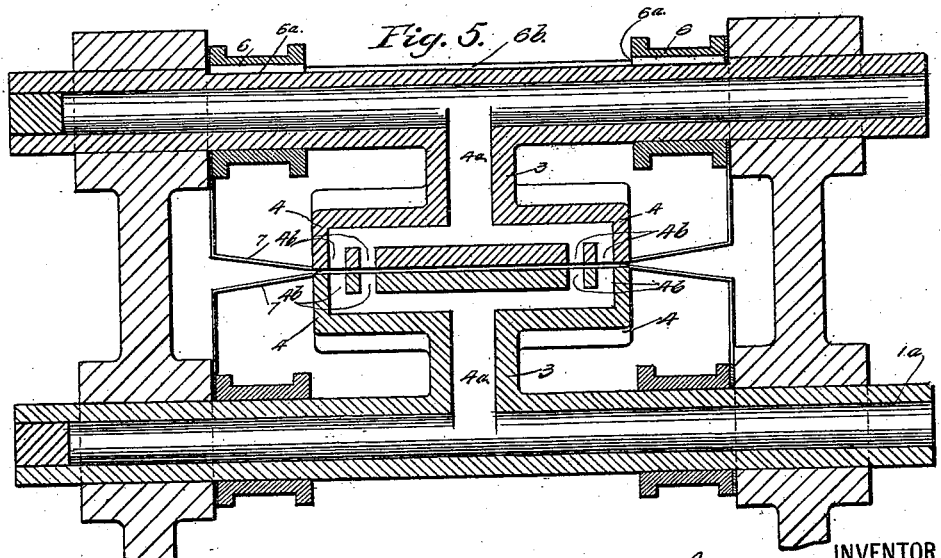

In the preferred embodiment of my invention shown in the drawings, Figure 1 represents a side elevation. Fig. 2 is a similar view with the side frame and one cam-wheel removed, showing the parts in a different position. Fig. 3 is a plan view of the device shown in Fig. 2, the folding device being in a slightly-different position. Fig. 4 is a front elevation of the rear set of rolls, parts being in section and others being shown in dotted lines. Fig. 5 is a detail section view on the line C D of Fig. 1 with the rolls in a slightly-advanced position. Figs. 6 and 7 are detail side elevations of parts of the rear rolls and adjacent parts, showing a bellows-folded bag being operated upon. Fig. 8 is a top plan view of the bag after the plies have been distended into their vertical position, as shown in Fig. 13, the central part D of the bag still being held flat. Fig. 9 is a plan view showing the folder in its position after having folded the plies downward into the position shown in perspective in Fig. 14. Fig. 10 is a view of the bag after the corners have been folded in and the plies folded down over them, as shown in Fig. 15. Figs. 11 to 15 are perspective views of the bag in the different steps of its manipulation, Fig. 11 being a perspective view of a bellows-folded bag as it is received by the machine in its flattened condition. Fig. 12 shows the bag with its plies slightly distended, the central portion being still held flat. Fig. 13 shows the bag with the plies completely distended. Fig. 14 shows the bag after the plies have been folded toward each other over the folded-in corners and corresponds to Fig. 9, and Fig. 15 shows a completely-folded bag as delivered by the machine. Fig. 16 is a perspective view of the reciprocating folder and a bag in the position in which the corners are being folded inward between the plies.

In the preferred embodiment shown in the drawings, 1 is the base, and 2 2 are the sides, of the frame of the machine.

My invention is particularly intended for folding a common bellows-folded bag; but it may be used with other forms of bag, if desired. The drawings show a roll, preferably a plurality of rolls 3 3, between which the bottom end of the bag is received and by which the bag is fed forward to the distending means, including in this embodiment a suction device, which is adapted to contact with the bag to distend the same. In the present embodiment there are a pair of suction devices for each roll. One of these suction devices may be located on each side of each roll and be rotatable with the roll. I prefer to form the suction devices by the extensions 4 4, which are hollowed out and connect with the hollowed portion $4^a$ of the rolls and the hollow shafts 1 and $1^a$, which carry the rolls. The hollowed extensions 4 are provided with preferably a plurality of suction-apertures $4^b$ in the periphery.

As the bottom end of the bag is fed forward to the rolls the rolls are rotated in the direction shown by the arrows in Fig. 1 and grasp the bag and feed it forward. I preferably form the rolls 3 comparatively narrow, so that they will hold only the central portion of the bag in a substantially flattened condition. By "flattened" I do not mean that the bag must necessarily be absolutely flat, but only that it should not be fully distended, and by the word "bag" I mean to include also a bag-tube, whether or not the bottom has already been closed. As the rolls are rotated from the position shown in Fig. 1 to that shown in Fig. 5, the extensions 4 will overlap the plies of the bag and the apertures $4^b$ will be closed by said plies. If now air is exhausted from said rolls, the plies of the bag will cling to the extensions 4, and as the roll is further rotated to the position shown in Fig. 6 the bag will be carried forward and simultaneously the plies will be distended, as shown. In Fig. 1 I have shown a suction-pump which can be connected to the hollowed rolls 1 and $1^a$ for so exhausting the air; but obviously any suitable means for accomplishing this result will suffice. In Fig. 1, 26 is the cylinder in which moves the piston 27, driven by piston-rod 28. 29 is a tube which may be connected to the open end of hollow shafts 1 and $1^a$ for exhausting the air from the rolls. This pump may be worked by hand or by a suitable connection with the machine, if desired. The space between the piston and the head of the cylinder will form a vacuum-chamber; but I mean by "vacuum-chamber" to include any space from which the air has been partially exhausted.

As the lower portion of the bag leaves the bite of the rolls the central portion D (see Figs. 8 and 12) enters between the guideways $4^c$ $4^c$, (see Figs. 2 and 6,) which hold the central part of the bag in a substantially flattened condition. In order to assist in distending the plies of the bag, I have provided means rotatable with the roll and adapted to engage the plies of the bag and accomplish this result. In the present embodiment this consists of distending-fingers 7 7, one of the same located on each side of each roll. These distending-fingers are preferably formed in the shape shown in the drawings; but it will be obvious that the shape is not material to my invention. In the present embodiment these fingers are fixed to collars 6 6 on the shafts 1 $1^a$ and are provided with feathers $6^a$ $6^a$, which slide in a feather-way $6^b$ on each shaft. By such a construction the fingers may move inward toward each other and also rotate with the rolls. To accomplish the lateral movement of the collars 6, I have provided arms 9 9, pivoted to the shaft $9^a$ and carrying roller-studs 8 8, which are located in grooves in the face of the collars. The lower arms 9 (see Fig. 1) are extended beyond the pivots into lever-arms 12, carrying roller-studs 13, which engage with cam-grooves $13^a$ (see Fig. 3) in the face of cam-rollers 14 15, mounted upon the driving-shaft 19. These cam-grooves are so timed that as the rolls move forward and upward from the position shown in Fig. 5 toward that shown in Fig. 6 the levers 12 will throw the fingers 7 inward. They will thus enter between the plies at each side of the bag at the rear of the suction-chambers 4, as shown in Fig. 6, and as the rolls are further advanced the plies will be distended from the position shown in Figs. 6 and 12 toward that shown in Fig. 3 and in dotted lines in Fig. 4.

I prefer that my machine should receive and act upon the bags as they come from the bag-forming machine having the bottom newly formed. When a bag is received in this condition, the paste will not yet be dried and the transverse seam C (shown in Fig. 11) will be liable to be pulled apart by this drawing apart of the plies if some pressure is not applied to the bottom to turn the corners back to the position shown in Fig. 13. To assist in turning back the corners and preferably also to press upon the bottom-seam, I have provided a rearwardly-moving folding device to assist in folding back the corners. This may consist of a pair of plates 23 23, having inwardly-inclined and longitudinally-grooved faces, as shown in Figs. 2, 3, 4, and 16. These plates 23 receive the corners of the bottom of the bag (shown in Fig. 11) within the grooved faces of the folder, (shown in Fig. 2,) and as the folding device is moved farther backward the plates will turn in the corners (see Figs. 12 and 16) to the position shown in Figs. 9, 10, and 13, at the same time pressing upon the transverse seam of the bottom. In order to then turn the plies from the position shown in Fig. 13 down upon these corners to the positions shown in Figs. 14 and 15, I have provided inwardly-turned prongs 24, which will receive the inclined edges E, Fig. 9, of the plies and turn them down, as shown in Figs. 9 and 16, to the flattened condition shown in Fig. 15. The backward-and-forward movement of the folding device is in this embodiment accomplished by attaching the rear ends of prongs 24 to the rear end of a bar 22. This bar terminates at its rear end in a fork $22^a$ $22^b$, Fig. 2, through which the bottom end of the bag passes. The upper pair of prongs 24 are attached at their rear ends to the rear end of the upper tine $22^b$ (see Figs. 2, 3, and 9) and extend outwardly and downwardly. The lower part of prongs are attached to the lower tine $22^a$ and extend outwardly and upwardly. Bridges $24^a$, Figs. 2 and 4, connect the upper and lower prongs at each side, and to these bridges are attached the plates 23, Fig. 4. Bar 22 slides upon driving-shaft 19, as shown in Fig. 2, and has a roller-stud 25 engaging with a cam-groove 20 in the perpendicular face of the cam-wheel 15, as shown in said figure. The bar 22 is guided by the tines $22^a$ and $22^b$ sliding outside of the guides $4^c$ $4^c$, Fig. 2. In said Fig. 2 the folding device is shown at its forward limit of movement, and the cam-face $20^a$ of the cam-groove is in a position to immediately start the folding device in its backward traverse.

In the present embodiment of my device the folded bag is not passed out of the machine at its forward end; but the bag after being folded as specified is moved backward by the backward rotation of the rolls 3 3 and delivered at the rear of the machine, where it entered. This is the preferable construction; but I do not desire to be limited to this feature. This rearward motion of the rolls, as well as the forward movement of the same, is controlled by gear-wheels 16 on shafts 1 and 1ª meshing with racks on the reciprocating arm 18, (see Figs. 3 and 4,) which slides in guideways 18ª, Fig. 3, on the frame and carries at its forward end a roller-stud 21, located in the cam-groove 21ª, Fig. 2, in the outer perpendicular face of the cam-wheel 15. In the present embodiment this cam-groove 21ª is so formed that the rolls 3 3 remain in the position shown in Fig. 2 during part or all of the rearward movement of the folding device and then rotate backward to carry said bag backward, as shown in Fig. 7. While this operation has been going on the cam-grooves 13ª, Fig. 3, have withdrawn the distending-fingers 7 from between the plies, and as the rolls rotate backward from the position shown in Fig. 7 the extensions 4 of the rolls will press down the plies and compress the corners so that the folds F, Figs. 13, 14, and 15, will be clearly defined, so that when the bag is distended it will tend to assume the rectangular-bottomed form.

It will be obvious that many changes may be made in the constructions herein disclosed without departing from the spirit of my invention, and I therefore do not desire to be limited to the embodiment herein shown and described.

What I claim is—

1. In a bag-machine in combination, a rotatable suction device adapted to contact with a flattened completed bellows-folded bag, means to exhaust the air from said suction device and rotate the same whereby said bag is distended at its bottom, means rotatable on substantially the same axis with said suction device and adapted to engage said bag and assist in distending the same, and means to fold the corners of said bag backward between the plies thereof.

2. In a bag-machine in combination, a set of rotatable suction devices adapted to receive between them a completed bellows-folded bag, means to exhaust air from said suction devices and means to rotate the same whereby said bag may be distended at its bottom, and a rearwardly-moving folder to then fold part of said distended bottom backward between the plies of said bag.

3. In a bag-machine in combination, a set of rotatable suction devices, adapted to receive between them a completed bellows-folded bag, means to exhaust air from said suction devices and means to rotate the same whereby said bag may be distended at its bottom, and a reciprocating folder to then fold the corners of said distended bottom backward between the plies of said bag.

4. In a bag-machine in combination, a set of oscillating rolls provided with suction devices and adapted to receive between them a bellows-folded bag, means to exhaust air from said suction devices and means to rotate said rolls to carry said bag forward and distend the same, and a rearwardly-moving folder to fold the corners of said bag backward between the plies thereof.

5. In a bag-machine in combination, a set of oscillating rolls provided with suction devices rotatable therewith and adapted to receive between them a flattened bellows-folded bag, means to exhaust air from said suction devices and means to rotate said rolls whereby said bag is fed forward and distended at its bottom, a reciprocating folder adapted to fold the corners of said bag backward between the plies thereof, and means to rotate said rolls backward to carry said folded bag backward to deliver the same.

6. In a bag-folding machine in combination, a set of rolls adapted to feed forward a bellows-folded bag, means rotatable with said rolls and adapted to contact with said bag and distend the plies of the same at its bottom, a stationary guide to receive the longitudinally-central portion of said bag as it leaves said rolls and hold the same in a substantially flattened condition, while the plies are distended, and a reciprocating folder to fold the corners of the bottom of said bag backward between the plies thereof.

7. In a bag-folding machine in combination, a roll, means to rotate the same in one direction to assist in carrying a bag forward, means to distend the bag at its bottom and means to fold backward a part of the distended bottom portion, and means to automatically rotate said roll backward and carry said folded bag backward to deliver the same.

8. In a bag-folding machine in combination a roll, means to rotate the same in one direction to assist in carrying a bellows-folded bag forward, means to distend the bag at its bottom and means to fold the corners of the bag backward between the plies of the bag, and means to automatically rotate said roll backward and carry said folded bag backward to deliver the same.

9. In a bag-folding machine in combination, a roll, means to rotate the same in one direction to assist in carrying a bag forward, means rotatable with said roll to distend the bag at its bottom, a folding device to fold backward a part of the distended portion, and means to automatically rotate said roll backward to carry said folded bag backward to deliver the same.

10. In a bag-folding machine in combination a roll, means to rotate the same in one direction to assist in carrying a bag forward, means including a suction device rotatable with said roll to distend the bag at its bottom, a folding device to fold backward a part of the distended portion, and means to automatically rotate said roll backward to carry said folded bag backward to deliver the same.

11. In a bag-folding machine in combination a roll, means to rotate the same in one direction to assist in carrying a bag forward, means to distend the bag, a folder, and means to move said folder backward and fold the corners of the bag backward and between the plies of the bag.

12. In a bag-folding machine in combination a plurality of rolls adapted to receive between them a bellows-folded bag, means to rotate the same forward to carry the bag forward, means including a suction device rotatable with each roll to distend the plies of the bag at each side, a folding device, means to move the same backward to fold the corners of the bag backward and between the plies of the bag, and means to automatically rotate said rolls backward and carry said folded bag backward to deliver the same.

13. In a bag-folding machine in combination a plurality of rolls adapted to receive between them a bellows-folded bag, each of said rolls having a hollowed portion provided with an aperture adapted to contact with one of the plies of said bag, means to rotate said rolls forward to carry said bag forward and means to exhaust the air from said hollowed portion to distend said bag, means to fold one corner of said bag backward and between the plies of the bag, and means to then rotate said rolls backward to deliver said bag.

14. In a bag-folding machine in combination means to feed forward and distend a part of the bottom of a bellows-folded bag, a rearwardly-moving folding device adapted to fold backward the corners of said bag, and means to fold down the plies over said folded corners.

15. In a bag-folding machine in combination means to feed forward and distend a part of the bottom end of a bellows-folded bag, a rearwardly-moving folding device adapted to fold backward the corners of said bag, and means, also carried by said rearwardly-moving folder, to fold down the plies over said folded corners.

16. In a bag-machine in combination a set of oscillating rolls adapted to receive between them a bellows-folded bag and hold the central portion in a substantially flattened condition, suction-chambers rotatable with said rolls and extending laterally at each side of each roll at the periphery thereof and adapted to contact with the plies near the bottom of the bag, means to rotate said rolls so that the contact-surfaces move forward, means to exhaust the air from said suction-chambers to distend the plies of said bag while the central portion of said bag is held in a substantially flattened condition, distending-fingers to assist in distending said plies, a rearwardly-moving folder to fold back the corners of said bag, and means to rotate said rolls backward to deliver said bag.

17. In a bag-folding machine in combination, a roll adapted to hold a portion of a bellows-folded bag in a flattened condition and feed the same forward, distending-fingers, means to insert said fingers within the plies of said bag near the bottom of said bag and move said fingers apart to distend said plies at the bottom of said bag, and a rearwardly-moving folder, movable independently of said roll, and adapted to press upon the bottom of said bag to turn back a part of said bottom while said fingers are distending said plies.

18. In a bag-folding machine in combination, a pair of rolls adapted to receive between them a bellows-folded bag, means to rotate the same to feed forward said bag, means to distend the bottom of the same, a folding device to fold the corners of the bag between the plies thereof, and means to reverse said rolls and carry said bag backward to deliver the same.

19. In a bag-folding machine in combination, a pair of rolls adapted to receive between them a bellows-folded bag, means to rotate the same to feed forward said bag, means to distend the bottom of the same, a reciprocating folding device to fold the corners of the bag between the plies thereof, and means to reverse said rolls and carry said bag backward to deliver the same.

20. In a bag-folding machine in combination, a pair of rotatable suction devices adapted to receive between them a bellows-folded bag, means to rotate the same to feed said bag forward and distend the same at its bottom, a folding device adapted to fold the corners of the bag between the plies thereof and means to reverse said suction devices to carry said bag backward to deliver the same.

Signed at New York, N. Y., this 26th day of November, 1900.

GEORGE R. WARD.

Witnesses:
EMERSON R. NEWELL,
JOSEPH E. DIAMOND.